United States Patent [19]

Canfield et al.

[11] Patent Number: 5,091,785
[45] Date of Patent: Feb. 25, 1992

[54] PICTURE-IN-PICTURE CIRCUITRY USING FIELD RATE SYNCHRONIZATION

[75] Inventors: Barth A. Canfield; David J. Duffield, both of Indianapolis, Ind.

[73] Assignee: Thomson Consumer Electronics, Inc., Indianapolis, Ind.

[21] Appl. No.: 340,944

[22] Filed: Apr. 20, 1989

[51] Int. Cl.$^5$ .............................................. H04N 5/262
[52] U.S. Cl. ...................................... 358/183; 358/22
[58] Field of Search ................. 358/183, 22, 182, 180

[56] References Cited

U.S. PATENT DOCUMENTS

| | | | |
|---|---|---|---|
| 4,249,211 | 2/1981 | Baba | 359/183 |
| 4,729,029 | 3/1988 | Henri | 358/183 |
| 4,739,406 | 4/1988 | Morton | 358/183 |
| 4,814,884 | 3/1989 | Johnson | 358/183 |
| 4,821,102 | 4/1989 | Ichikawa | 358/22 |

FOREIGN PATENT DOCUMENTS 182378 10/1983 Japan .................................. 358/183
2217549A 4/1989 United Kingdom .

OTHER PUBLICATIONS

RCA Digital VCR #728, Citicorp–Diner's Club Catalog, p. 44.

Primary Examiner—Tommy P. Chin
Attorney, Agent, or Firm—Joseph S. Tripoli; Peter M. Emanuel; Thomas F. Lenihan

[57] ABSTRACT

A picture-in-picture system including panning and scrolling capability moves an inset image about a display in synchronism with the vertical field rate in order to provide smooth movement from one display position to another.

20 Claims, 4 Drawing Sheets

PICTURE-IN-PICTURE CIRCUITRY USING FIELD RATE SYNCHRONIZATION

FIELD OF THE INVENTION

This invention relates to the field of television receivers having picture-in-picture capability.

BACKGROUND OF THE INVENTION

The term "television receiver" as used herein includes television receivers having a display device (commonly known as television sets), and television receivers without a display device, such as videocassette recorders (VCR's).

The term "television receiver" as used herein also includes television monitor/receivers having an RF tuner and baseband signal input circuitry.

Many modern television receivers have picture-in-picture (PIP, or PIX-IN-PIX) capability, that is, the capability to receive video signals from two sources and combine them to produce a signal which when displayed includes a first program in a main viewing area, and a second program in a secondary (inset) viewing area of the same display screen.

In addition to displaying an inset picture in one of the corners of the display, modern PIP circuitry also provides for the horizontal and vertical movement of the inset image about the display screen. Horizontal movement of the inset image is called "panning". Vertical movement of the inset image is called "scrolling". A system having this capability is known from TOSHIBA television receiver model 30ID1. Unfortunately, the TOSHIBA system produces horizontal and vertical motion of the inset image about the display screen that is noticeably and undesirably erratic (i.e., jerky).

SUMMARY OF THE INVENTION

A picture-in-picture system including panning and scrolling capability moves an inset image about a display in synchronism with the vertical field rate in order to provide a smooth movement of the inset image from one position to the next.

DETAILED DESCRIPTION OF THE EMBODIMENT

Figure 1:
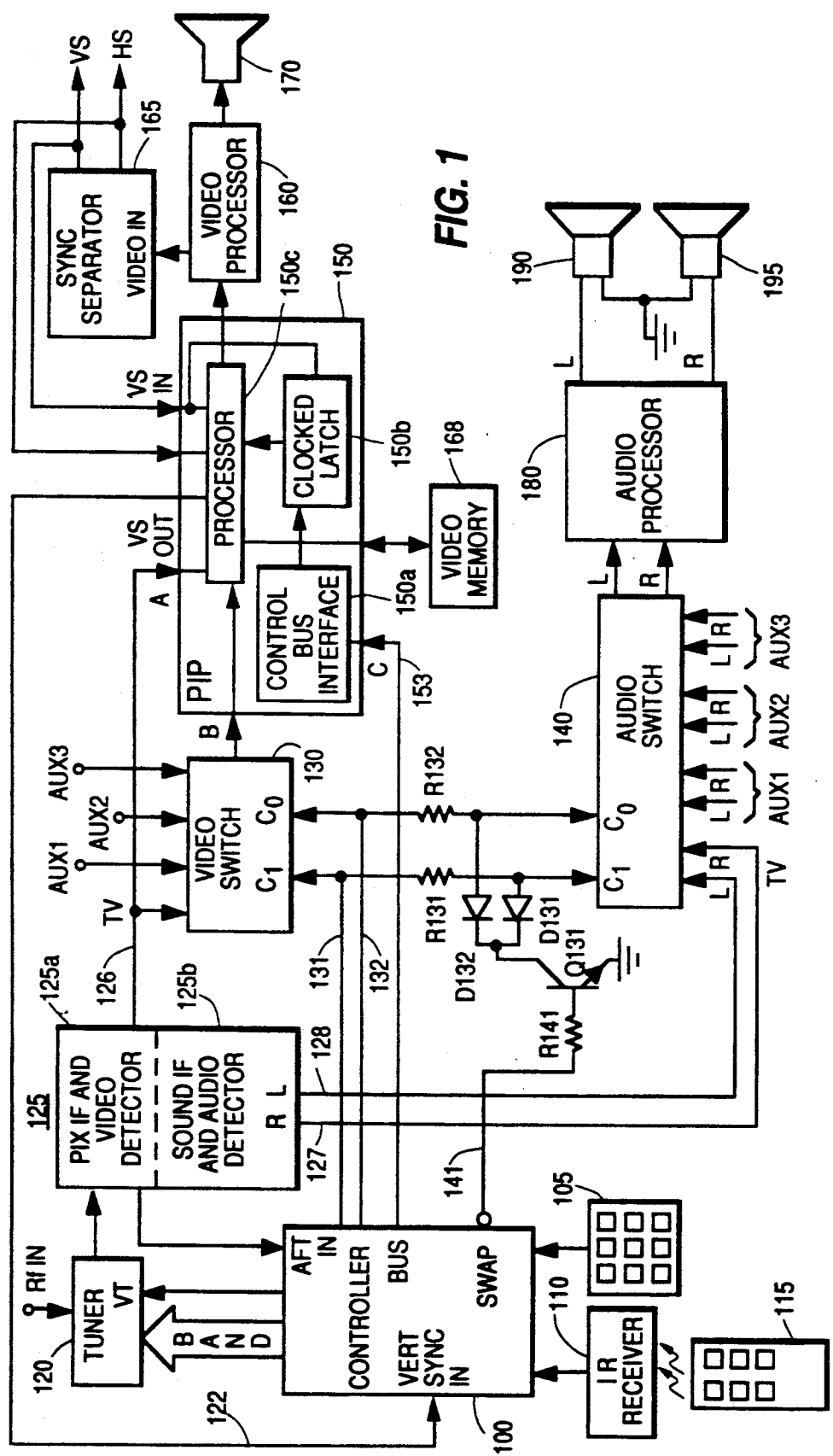
FIG. 1 illustrates, in block diagram form, an embodiment of the invention.

Referring to FIG. 1, a controller 100 receives user-entered control signals from a local keyboard 105 and from an infrared (IR) receiver 110. IR receiver 110 receives and decodes remote control signals transmitted by a remote control unit 115. Controller 100, which may be a microprocessor or microcomputer, causes a television tuner 120 to select a particular RF signal to be tuned in response to data entered by a user. Tuner 120 produces a signal at an intermediate frequency (IF) and applies it to a processing unit 125 comprising a first section 125a including a picture (PIX) amplifying stage an AFT circuit, and video detector, and a second section 125b including, a sound amplifying stage, an audio detector and a stereo decoder. Processing unit 125 produces a baseband video signal (TV), and baseband left and right audio signals. The AFT circuit of processing unit 125 also produces a signal from which AFT crossover is detected and applies it via line 124 to controller 100.

The baseband video signal (TV) is coupled via line 126 to one input of a four input video switch 130. The baseband left and right audio signals are applied to one pair of inputs of an audio switch 140 capable of selecting a pair of inputs from four pairs of audio inputs. Video switch 130 and audio switch 140 each have three other inputs labelled AUX1, AUX2 and AUX3, for receiving respective baseband video and audio signals from external sources. Each of the inputs of video switch 130 and audio switch 140 is selectable in response to binary signals generated by controller 100 and applied to control inputs $C_1$ and $C_0$ via conductors 131 and 132, respectively. For example, if $C_1$ and $C_0$ are both caused to be at a low signal level (i.e. binary 00), then the TV input is selected. If $C_1$ is low and $C_0$ high (binary 01), then AUX1 is selected. If $C_1$ is high and $C_0$ low (binary 10), then AUX2 is selected. If both $C_1$ and $C_0$ are high (binary 11), then AUX3 is selected. The selection of corresponding video and audio signals is ensured because the control lines 231 and 232 are coupled to respective control inputs $C_1$ and $C_0$ of both video switch 130 and audio switch 140.

The selected video signal is applied to a video processor unit 160 and ultimately displayed on a display screen of a display device 170. Video signals are also applied to a sync separator unit 165 which derives vertical and horizontal synchronizing signals therefrom. The selected audio signals are applied to an audio processor unit 180 and ultimately reproduced via speakers 190, 195. The above-described circuitry is essentially known from the RCA CTC-140 television receiver manufactured by Thomson Consumer Electronics, Indianapolis, Ind.

In accordance with the present invention, a picture-in-picture (PIP) unit 150 is shown inserted between video switch 130 and video processor 160. The A signal input of PIP unit 150 is connected to receive baseband signals from the built-in tuner/IF circuitry of the television receiver, and the B signal input is connected to receive the output signal of video switch 130. PIP unit 150 has a SYNC IN input for receiving vertical synchronizing signals from sync separator unit 165. Sync separator unit 165 also couples vertical synchronizing signals to a VERT SYNC IN terminal of controller 100 via a line 122. PIP unit 150 has a control input C to which a serial control bus 153 is coupled. Serial control bus 153 couples command data from controller 100 which controls PIP unit 150 to produce an image for display having a main (or primary) picture and an inset (or secondary) picture. Under controller command, via serial bus 153, the PIP function may be enabled and disabled, and the inset picture may be displayed, for example, in each of the four corners, or in several other areas. Also under controller command via serial bus 253, PIP unit 150 may be controlled to interchange (swap) the main and inset television images. The sound reproduced by speakers 190, 195 desirably "follows" (i.e., is the sound associated with) the image displayed as the main picture.

The structure of FIGS. 1 provides for selection of an audio signal in response to control signals applied to parallel-connected control inputs $C_1$ and $C_0$ of video signal switch 130 and audio signal switch 140, and also in response to a signal indicative of whether the main and inset pictures are swapped. This is accomplished by circuitry comprising resistors R131, R132, diodes D131, D132, transistor Q131, and a SWAP control line 141. The operation of the audio selection circuitry is not relevant to the subject invention, and therefore does not need to be described in detail.

Figure 2:
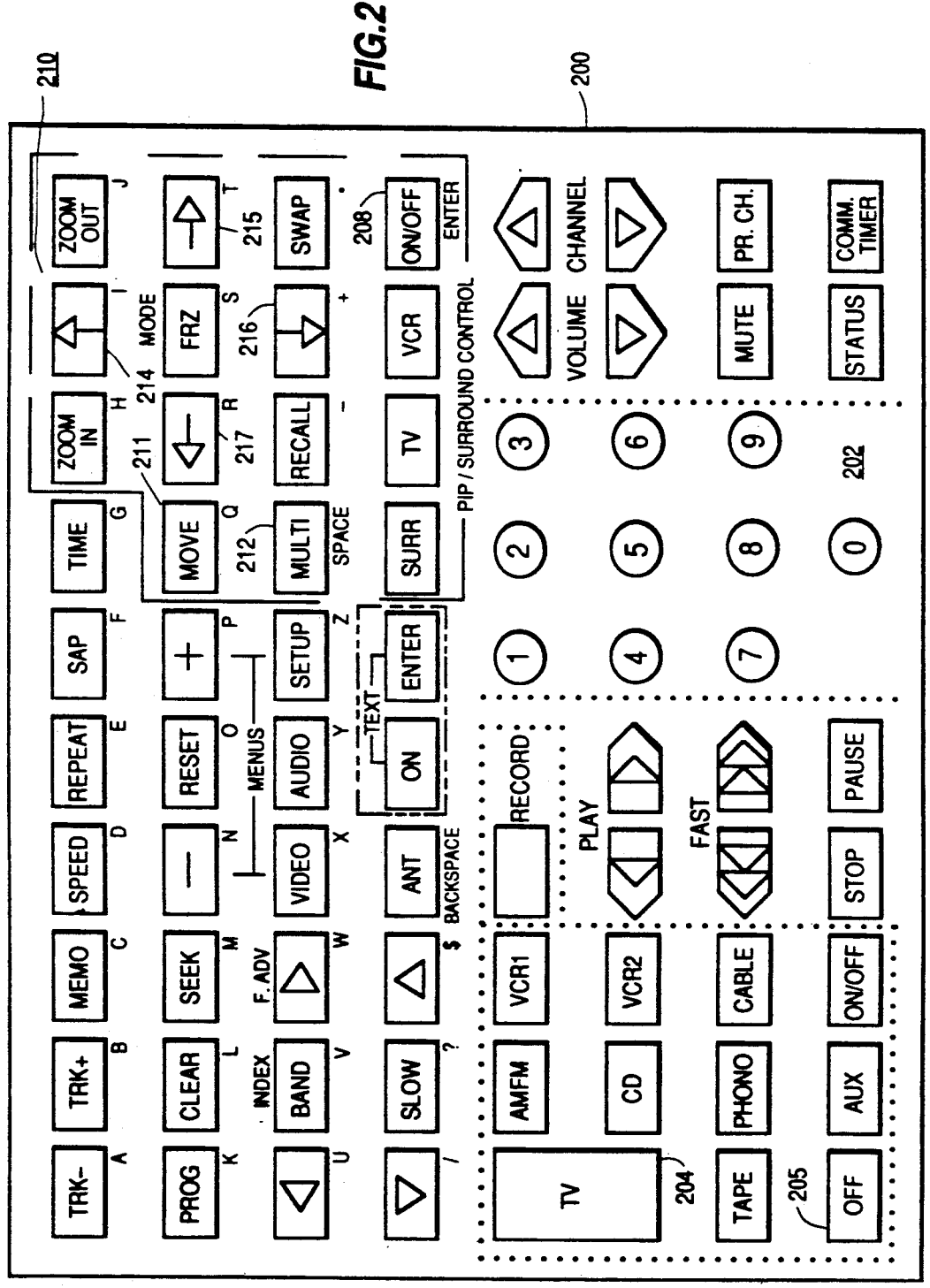
FIG. 2 illustrates a remote control handunit suitable for use with the invention.

IR receiver 110 receives IR signals transmitted by, for example, a remote control handunit such as the one shown in FIG. 2 and designated 200. Referring to FIG. 2, remote control handunit 200 includes keys 202 for entering the digits 0-9, for entering "channel-up" and "channel-down" commands and a key 204 for turning the receiver "on" and a key 205 for turning the receiver "off." Remote control handunit 200 also includes an array of keys 210 (labelled PIP/SURROUND CONTROL) including a key 208 (labelled ON/OFF), a key 211 (labelled MOVE), and 4 keys 214-217 (labelled with arrows) the operation of which will be described below. Remote control handunit 200 includes therein electronic circuitry (not shown) for encoding a signal to be transmitted by an IR diode in accordance with the particular keys pressed.

Figure 3:
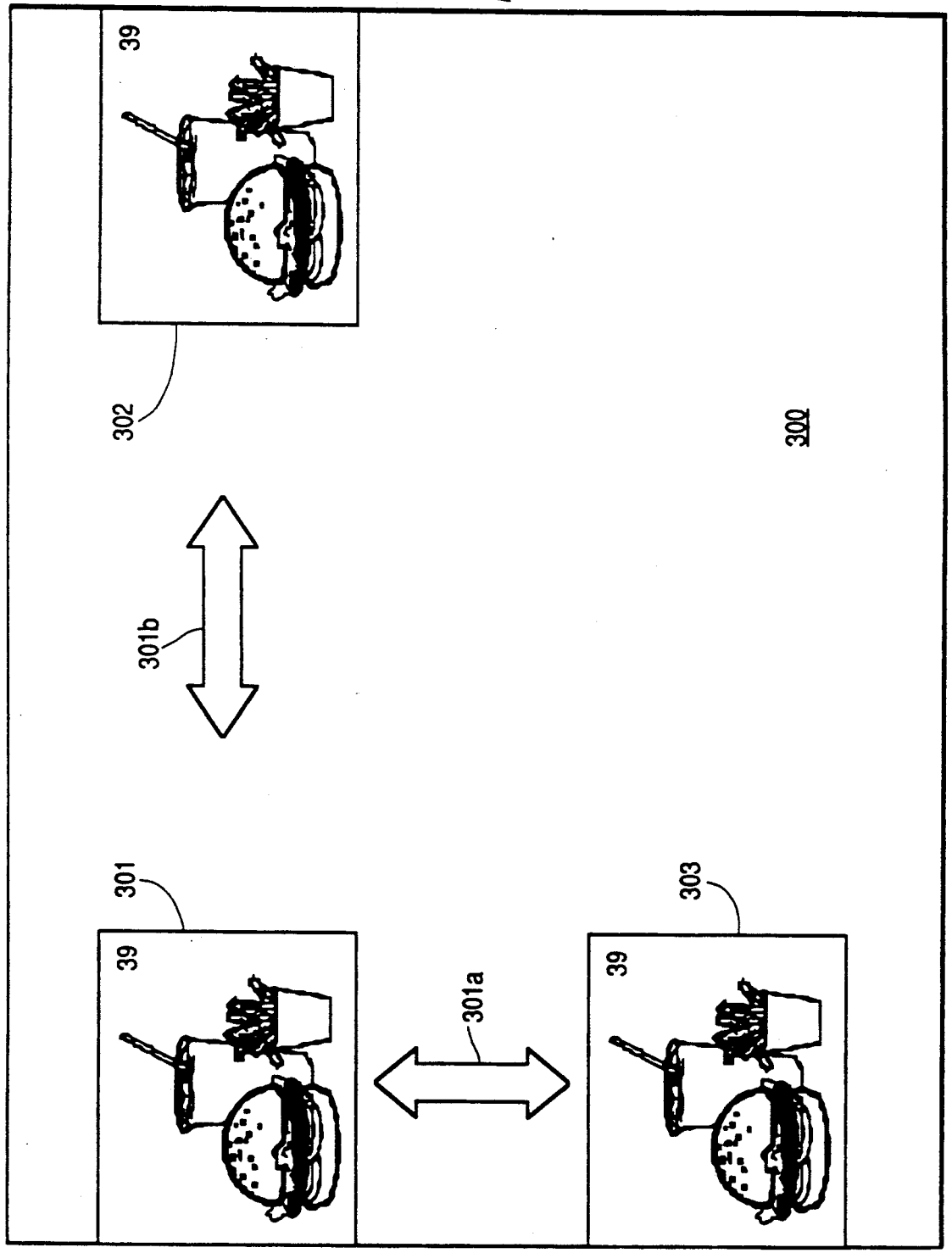
FIG. 3 illustrates a display screen known from the prior art, but useful in understanding the invention.

Controller 100, in response to a command from a user, controls PIP unit 150 via serial bus 153 to "pan" or "scroll" (i.e., move) the the inset image from one area of the display to another as mentioned above. Referring to prior art FIG. 3, an inset image is shown displayed in a first position 301 on a display screen 300. In response to panning commands issued by controller 100, the inset image may be moved horizontally through a number of display locations along an axis defined by double-headed arrow 301b, to a second location 302, or it may be displayed at any intermediate location. Similarly, in response to scrolling commands issued by controller 100, the inset image may be moved vertically through a number of display locations along an axis defined by double-headed arrow 301a, to a third location 303, or it may be displayed in any intermediate location. Thus, by issuing a series of scrolling and panning commands, controller 100 can cause PIP unit 150 to position an inset image at any location on the display screen.

Panning and scrolling of the inset image is accomplished by changing the horizontal and vertical positions (i.e., read addresses) within video memory (VRAM) 168 from which PIP unit 150 begins reading video information. These read addresses are written into PIP unit 150 by controller 100 via serial bus 153.

The rate at which panning and scrolling is accomplished is dependent upon two factors. The first of these factors is the rate at which (VRAM) read addresses are changed, and the second factor is the difference between successive read addresses. It is recognized herein that in order to provide smooth movement while panning and scrolling the inset image, it is important to change the VRAM read addresses once during each successive field period (i.e., approximately 1/60th of a second in the U.S.), regardless of the desired rate of panning or scrolling. Fixing the rate at which VRAM read addresses are changed, to a constant rate of 60 Hz, causes the actual rate of panning or scrolling to be entirely a function of the difference between successive VRAM read addresses.

Accordingly, a vertical synchronizing signal (provided by sync separator 165) is applied to PIP unit 150 to synchronize the picture-in-picture processing. The vertical synchronizing signal is also applied via line 122 to a VERT SYNC IN terminal of controller 100. In this mode of operation, controller 100 supplies inset image positioning-related information to PIP unit 150 in response to the detection of the vertical synchronizing signal.

Controller 100 either monitors terminal VERT SYNC IN to detect the vertical synchronizing signal, or in the alternative may be interrupted from the performance of other tasks by the vertical sync signal. In either case, controller 100 can then cause PIP unit 150 to move the inset one or more steps in the desired direction in each video field time. The result is that circuitry in accordance with the present invention moves the inset about the display screen in a smooth manner. It is noted that while the inset appears to be continuously positionable, in fact, it actually is moved in discrete steps about a screen which is, for example, 180 positions wide by 140 positions high.

It is also recognized herein that it is undesirable to change a VRAM read address during the active scanning portion of a field period, because such a VRAM read address change may cause an abnormally displayed (e.g., "torn") picture. Two solutions are provided for this problem. First, controller 100 may be constrained to issue changes to VRAM read addresses only during the vertical blanking interval. While this solution will solve the problem, it may put an undue burden upon controller 100, which, of course, has other tasks to perform. This constraint is removed from controller 100 by the use of control bus interface unit 150a and clocked latch 150b of PIP unit 150. Latch 150b receives the VRAM read address commands sent from controller 100 at any time within a given field (but only once per field), but latch 150 is clocked with a vertical sync signal to transmit its data to processor 150c of PIP unit 150, only during the vertical blanking interval.

Figure 4:
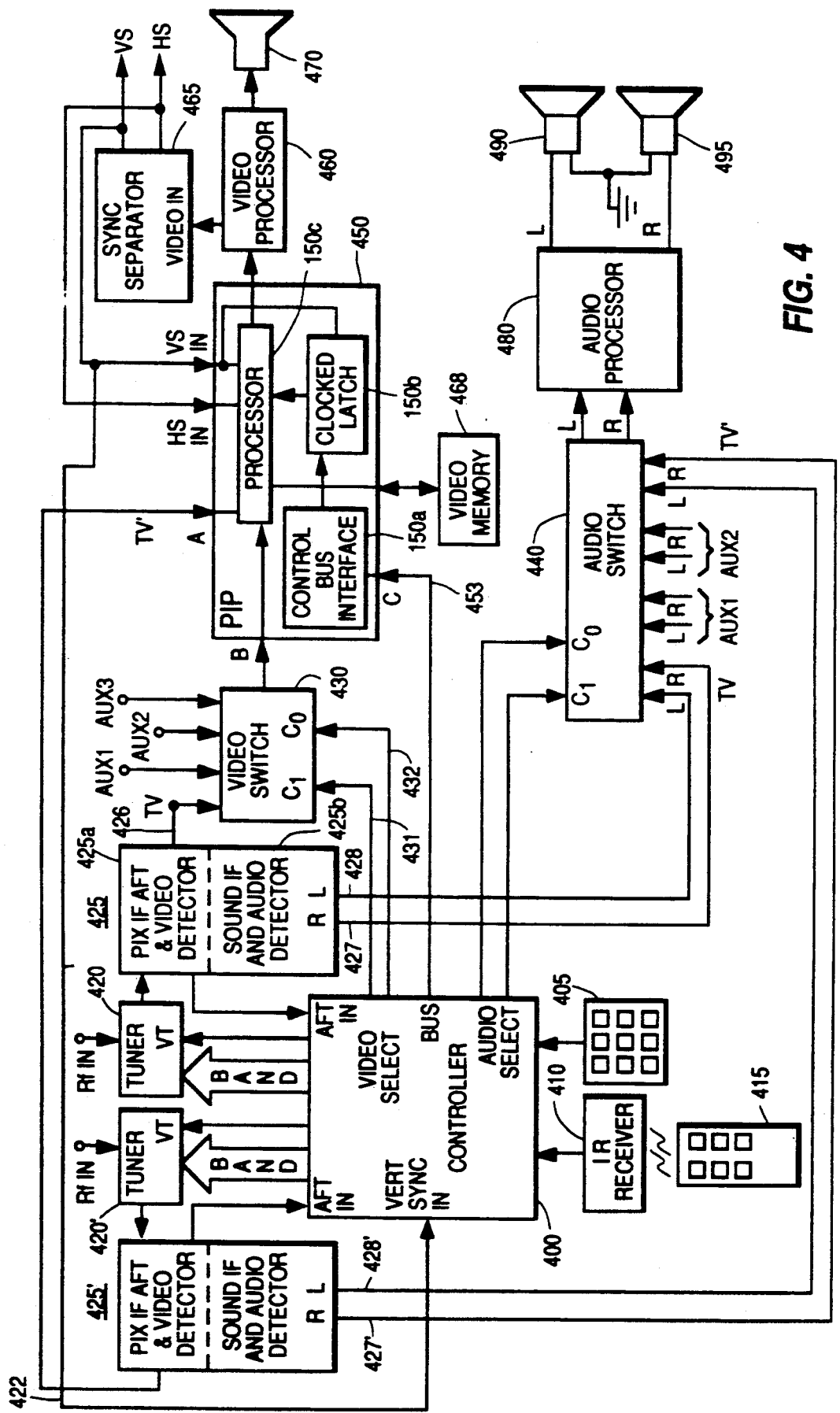
FIG. 4 illustrates, in block diagram form, another embodiment of the invention.

A two-tuner embodiment of the invention is shown in FIG. 4. Elements of the additional tuner bear primed reference numbers otherwise identical to the reference numbers of the first tuner. Those elements of FIGS. 1 and 4 which bear similar reference numbers, serve the same function and therefore need not be described again in detail. In this embodiment the diode audio select logic is removed and audio selection is controlled directly by controller 400.

The video signal TV' produced by processing unit 425' is applied directly to the A input of PIP unit 450. The audio signal TV' produced by processing unit 425' is applied to audio switch 440. Controller 400 controls audio switch 440 such that when the main picture is the video corresponding to TV', then the TV' audio is selected. Note that both processing unit 425 and processing unit 425' have AFT signals coupled to controller 400 at input terminals AFT and AFT', respectively. These AFT signals indicate the completion of the tuning of channels at the respective tuners.

While the above-described embodiment used the vertical synchronizing signal to control pan and scroll features, it is recognized herein that other features of PIP unit 150, such as "zoom" (i.e., enlargement of the area within the inset image), and "freeze" functions can also be improved by synchronizing their operation to the vertical synchronizing signal.

It is further recognized herein that the subject invention is also useful for providing smooth pan and scroll action when panning and scrolling within an enlarged (i.e., "zoomed") frozen picture. That is, a portion of a full screen picture may be enlarged ("zoomed") so that the enlarged portion (e.g., about 25% of the original picture) fills the entire screen. In order to perform such a zoom, the freeze key (FRZ) of keyboard 200 is pressed, causing a stable still picture to be displayed on a display screen. The ZOOM feature enlarges the frozen picture by a factor of two (2X magnification) by operation of the ZOOM-IN key. Of course, the display screen can only display 25% of the expanded frozen picture. The 25% chosen for display is the center 25% of the original frozen picture. Operation of each of arrow keys 214-217 of keyboard 200 causes the enlarged area to be panned and scrolled within the original frozen picture by enlarging an area for display which is slightly offset in the direction of the particular arrow key being pressed, than was the area previously displayed.

Other modifications also envisioned include that a zoom may be performed without having first pressed the freeze key (i.e., zoom on a moving picture), and that the zoom magnification may be other than 2X.

What is claimed is:

1. A television receiver having picture-in-picture capability, comprising:
   an RF signal input for receiving a plurality of television RF signals;
   television tuner means for selecting a particular RF signal from said plurality of signals in response to a tuner control signal, and producing an IF signal from said selected RF signal;
   IF processing and detector means coupled to said tuner means for receiving said IF signal and producing a detected baseband video signal therefrom;
   control means coupled to said tuner means for generating said tuner control signal in response to data signals;
   data input means coupled to said control means for generating said data signals in response to activation by a user;
   a first auxiliary baseband video signal input terminal for receiving a first auxiliary baseband video signal;
   picture-in-picture processing means having a first signal input coupled to said video detector means for receiving said detected baseband video signal and a second signal input coupled to said first auxiliary baseband video input terminal means for receiving said baseband video signal, and combining said video signals to form a combined image signal which when displayed has a major portion, and has a minor portion displayed in a first position, said picture-in-picture processing means having a control input for receiving a second control signal from said control means, and having an output terminal for developing said combined image signal in response to said second control signal; and
   synchronizing means coupled to said output terminal of said picture-in-picture processing means for receiving said combined image signal and for generating a television vertical synchronizing component signal therefrom;
   said control means having an input for receiving said television vertical synchronizing component signal, said control means generating said second control signal in response to said data signals and in response to said television vertical synchronizing component signal to course said picture-in-picture processing means to form a combined image signal which when displayed has said minor portion displayed in a position offset from said first position by a predetermined step size in a desired direction, said predetermined step size being substantially smaller than the displayed height and width of said minor portion of said image.

2. The television receiver of claim 1 wherein said control means is a microprocessor.

3. The television receiver of claim 2 wherein said data input means includes a keyboard.

4. The television receiver of claim 3 wherein said data input means includes a remote control receiver for receiving remote control signals.

5. The television receiver of claim 4 wherein said data signals indicative of the operation of keys for causing horizontal and vertical movements of said minor portion of said combined image signal about a display produced in response to said combined image signal.

6. The television receiver of claim 4 wherein said data signals include a signal indicative of the operation of a FREEZE key.

7. The television receiver of claim 4 wherein said data signals further include a signal indicative of the operation of a ZOOM key for enlargement of said minor portion of said combined image signal.

8. A picture-in-picture system comprising:
   data entry means for generating data signals in response to activation by a user;
   a source of video signals;
   memory means coupled to said source of video signals for storing image to be displayed on a display screen;
   picture-in-picture processing means coupled to said source of video signals for receiving said video signals, for storing in said memory means a predetermined amount of said video signals in response to a control signal, and for producing a display signal which when displayed on said display screen produces a display comprising an image displayed in a first position of a plurality of positions, said image being related to said stored video signal,
   means coupled to said picture-in-picture processing means for producing a vertical synchronizing signal corresponding to a synchronizing component of said display signal; and
   control means for controlling said picture-in-picture processing means, said control means having a first input coupled to said data entry means for receiving said data signals, having a second input for receiving said vertical synchronizing signal, and having a first output for developing said control signal;
   said control means in response to said data signals and in response to said vertical synchronizing signal generates said control signal causing said picture-in-picture processing means to display said image in a second position offset from said first position by a predetermined step size in a desired direction, said predetermined step size being substantially smaller than the displayed height and width of said image.

9. The system of claim 8 wherein said control means is a microprocessor.

10. The system of claim 9 wherein said data entry means includes a keyboard.

11. The system of claim 10 wherein said data entry means includes a remote control receiver for receiving remote control signals.

12. They system of claim 11 wherein said data signals include signals indicative of the operation of keys for causing horizontal and vertical movements of said minor portion of said image about said display.

13. The system of claim 11 wherein said data signals include a signal indicative of the operation of a FREEZE key.

14. The system of claim 11 wherein said data signals further include a signal indicative of the operation of a ZOOM key for enlargement of said minor portion of said image.

15. A television receiver having picture-in-picture capability, comprising:
   a first RF signal input for receiving a plurality of television RF signals;
   first television tuner means for selecting a particular RF signal from said plurality of signals in response to a first tuner control signal, and producing a first IF signal from said selected particular RF signal;
   first IF processing and detector means coupled to said first tuner means for receiving said first IF signal and producing a first detected baseband video signal therefrom;
   a second RF signal input for receiving a plurality of television RF signals;
   second television tuner means for selecting a particular RF signal from said plurality of signals in response to a second tuner control signal, and producing a second IF signal from said selected particular RF signal;
   second IF processing and detector means coupled to said second tuner means for receiving said second IF signal and producing a second detected baseband video signal therefrom;
   control means coupled to said first and second television tuner means for generating said first and second tuner control signals in response to data signals;
   data input means coupled to said control means for generating said data signals in response to activation by a user;
   picture-in-picture processing means having a first signal input coupled to said first IF processing and video detector means for receiving said first detected baseband video signal and a second signal input coupled to said second IF processing and video detector means for receiving said second detected baseband video signal, and combining said video signals to form a combined image signal which when displayed has a major portion, and has a minor portion displayed in a first position, said picture-in-picture processing means having a control input for receiving a second control signal from said control means, and having an output terminal for developing said combined image signal in response to said second control signal; and
   synchronizing means coupled to said output of said picture-in-picture processing means for receiving said combined image signal and for generating a television vertical synchronizing component signal therefrom;
   said control means having an input for receiving said television vertical synchronizing component signal, said control means generating said second control signal in response to said data signals and in response to said television vertical synchronizing component signal causes said picture-in-picture processing means to form a combined image signal which when displayed has said minor portion displayed in a position offset from said first position by a predetermined step size in a desired direction, said predetermined step size being substantially smaller than the displayed height and width of said minor portion of said image.

16. The television receiver of claim 15 wherein said control means is a microprocessor.

17. The television receiver of claim 16 wherein said data input means includes a keyboard.

18. The television receiver of claim 17 wherein said data input means includes a remote control receiver for receiving remote control signals.

19. The television receiver of claim 18 wherein said data signals include signals indicative of the operation of keys for causing horizontal and vertical movements of said minor portion of said image about said display.

20. The television receiver of claim 17 wherein said data signals further include a signal indicative of the operation of a ZOOM key for enlargement of said minor portion of said image.

* * * * *

UNITED STATES PATENT AND TRADEMARK OFFICE
CERTIFICATE OF CORRECTION

PATENT NO. : 5,091,785

DATED : February 25, 1992

INVENTOR(S) : Barth A. Canfield, et al.

It is certified that error appears in the above-identified patent and that said Letters Patent is hereby corrected as shown below:

Column 5, line 66 (Claim 1), that portion reading "course" should read -- cause --;

Column 6, line 14 (Claim 5), after "signals" and before "indicative" insert -- include signals --

Signed and Sealed this

Twentieth Day of July, 1993

Attest:

MICHAEL K. KIRK

*Attesting Officer*  *Acting Commissioner of Patents and Trademarks*